United States Patent
Lan et al.

(10) Patent No.: US 8,243,219 B2
(45) Date of Patent: Aug. 14, 2012

(54) LCD DISPLAY AND METHOD THEREOF

(75) Inventors: Tung-Hsin Lan, Taipei (TW); Mu-Shan Liao, Taoyuan County (TW); Tien-Yung Huang, Pingtung County (TW); Chia-Chun Fang, Kaohsiung (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 617 days.

(21) Appl. No.: 12/542,713

(22) Filed: Aug. 18, 2009

(65) Prior Publication Data

US 2010/0253866 A1    Oct. 7, 2010

(30) Foreign Application Priority Data

Apr. 6, 2009    (TW) ................................ 98111413 A (51) Int. Cl.
*G02F 1/1343*    (2006.01)
*G02F 1/136*    (2006.01)
*G02F 1/1337*    (2006.01)

(52) U.S. Cl. ............. 349/38; 349/48; 349/129; 349/130

(58) Field of Classification Search .................... 349/38, 349/48, 129, 130
See application file for complete search history.

(56) References Cited

U.S. PATENT DOCUMENTS

| 7,167,154 B2 * | 1/2007 | Sato et al. ...................... 345/100 |
| 7,199,777 B2 * | 4/2007 | Moon ............................. 345/89 |
| 8,004,626 B2 * | 8/2011 | Ting et al. ....................... 349/48 |
| 2006/0208984 A1 * | 9/2006 | Kim et al. ....................... 345/90 |

FOREIGN PATENT DOCUMENTS

| JP | H05119346 A | 5/1993 |
| JP | 2003322866 A | 11/2003 |
| JP | 2004004590 A | 1/2004 |
| JP | 2006085131 A | 3/2006 |
| JP | 2006126842 A | 5/2006 |
| JP | 2006189473 A | 7/2006 |
| JP | 2008033218 A | 2/2008 |

* cited by examiner

*Primary Examiner* — Mike Qi
(74) *Attorney, Agent, or Firm* — Winston Hsu; Scott Margo (57) ABSTRACT

Each pixel of an LCD display includes a main pixel, a sub-pixel, a resistor, and a third switch. The third switch is used for controlling the charging time of the main pixel and the sub-pixel. A data signal of a main pixel of a previous pixel is utilized to pre-charge the main pixel and the sub-pixel, and then data is transmitted to the sub-pixel and the main pixel. When data transmission to the sub-pixel is ended, the data transmission path to the sub-pixel is switched off, and the data keeps being transmitted only to the main pixel. The LCD panel utilizing this method only needs to add one gate line at each of the top and bottom of the panel to realize the AMVA structure of 8-domain for the LCD panel.

11 Claims, 6 Drawing Sheets

LCD DISPLAY AND METHOD THEREOF

BACKGROUND OF THE INVENTION

1. Field of the Invention

The present invention is related to a liquid crystal display (LCD) that utilizes 8-domain advanced multi-domain vertical alignment (AMVA), and more particularly, to an LCD that utilizes two thin film transistors (TFTs) for a main pixel and a sub-pixel, and a switch element for controlling a charge time of the main pixel and the sub-pixel, and a related method.

2. Description of the Prior Art

Many 8-domain advanced multi-domain vertical alignment (AMVA) LCD display panels divide each pixel into two pixel elements, namely a main pixel and a sub-pixel, and drive the two pixel elements with different driving voltages to angle the two pixel elements differently, thereby forming different optical characteristics to achieve a wide viewing angle. Angling of the main pixel and the sub-pixel may be realized in a number of different ways, including capacitor/capacitor type (CC-type) pixels realized through use of capacitors, and transistor/transistor type (TT-type) pixels realized through use of thin-film transistors (TFTs). A third type, called "Com-Swing-type", utilizes changing the common voltage Vcom of the main pixel and the sub-pixel to angle the two pixel elements differently. CC-type utilizes capacitive coupling to adjust a capacitance ratio of a capacitor between the main pixel and the sub-pixel and a liquid crystal capacitor, such that the driving voltages of the main pixel and the sub-pixel may be different. TT-type utilizes different gate signal lines or data signal lines to provide different driving voltages to the main pixel and the sub-pixel. Com-swing-type makes the voltages of the main pixel and the sub-pixel different by adjusting a Vcom electrode of storage capacitors of the main pixel and the sub-pixel. One disadvantage of CC-type is that once the capacitance of the capacitor electrically connected between the main pixel and the sub-pixel is decided, the driving voltages of the main pixel and the sub-pixel are also decided. Thus, freedom to alter the design is lost. Further, because the main pixel and the sub-pixel are electrically connected through the capacitor, the main pixel and the sub-pixel are no longer mutually independent, but are linked together, which leads to yellow/red banding. Com-swing-type faces a similar problem. Once the voltage of the Vcom electrode of the storage capacitors of the main pixel and the sub-pixel is decided, relations of the 0-255 levels of the main pixel and the sub-pixel cannot be changed, barring free adjustment of the main pixel and the sub-pixel. Likewise, the main pixel and the sub-pixel are interlinked, and not mutually independent, which leads to the yellow/red banding problem. Only TT-type utilizes different data signal lines to provide different driving voltages directly to the main pixel and the sub-pixel, or utilizes different gate signal lines to adjust charge time of the main pixel and the sub-pixel. TT-type can freely adjust the driving voltages of the main pixel and the sub-pixel, and the main pixel and the sub-pixel are mutually independent, which prevents the yellow/red banding problem, and improves color shift performance.

Figure 1:
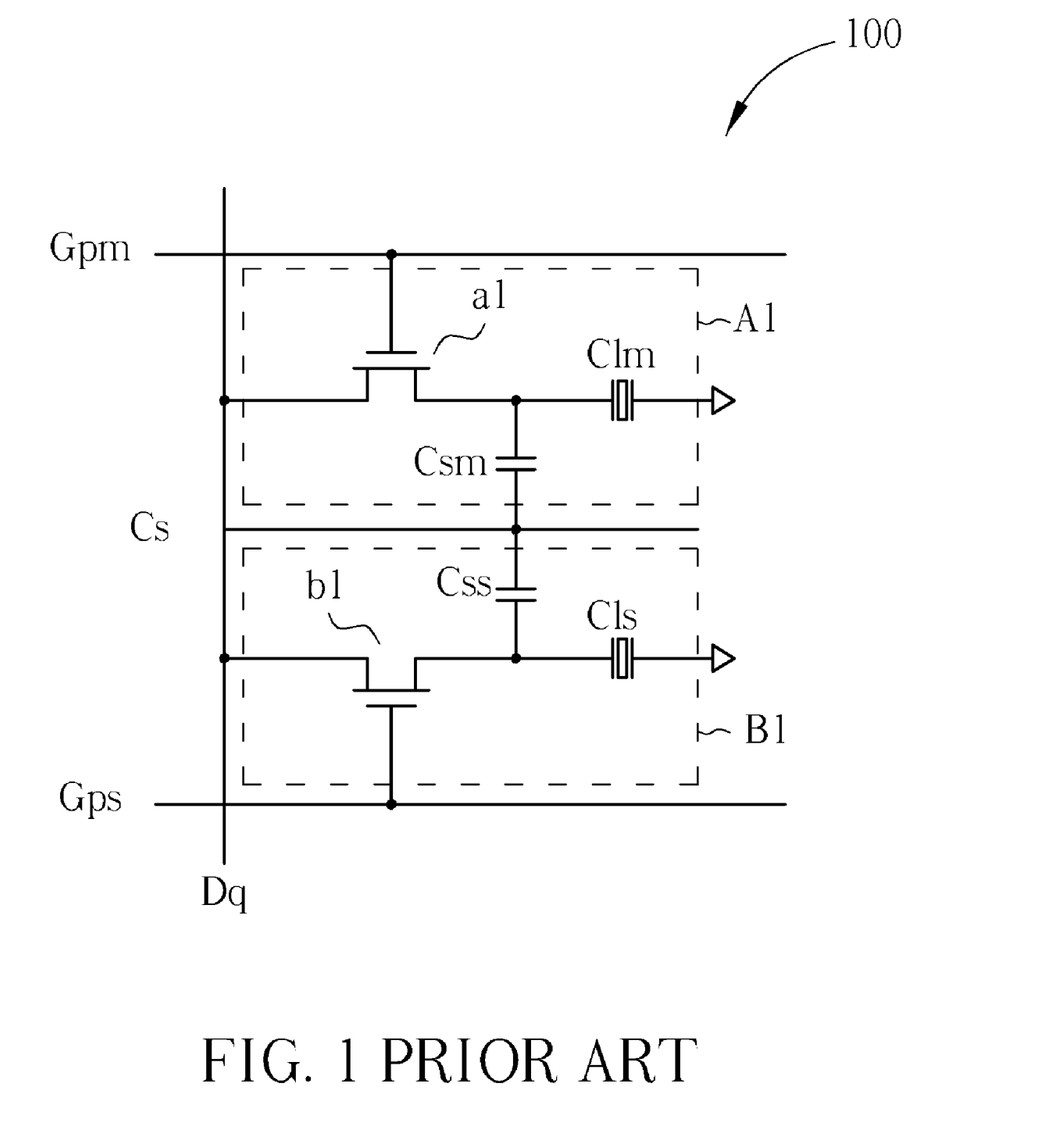
FIG. 1 is a diagram of a 2G1D TT-type pixel architecture of the prior art.
Figure 2:
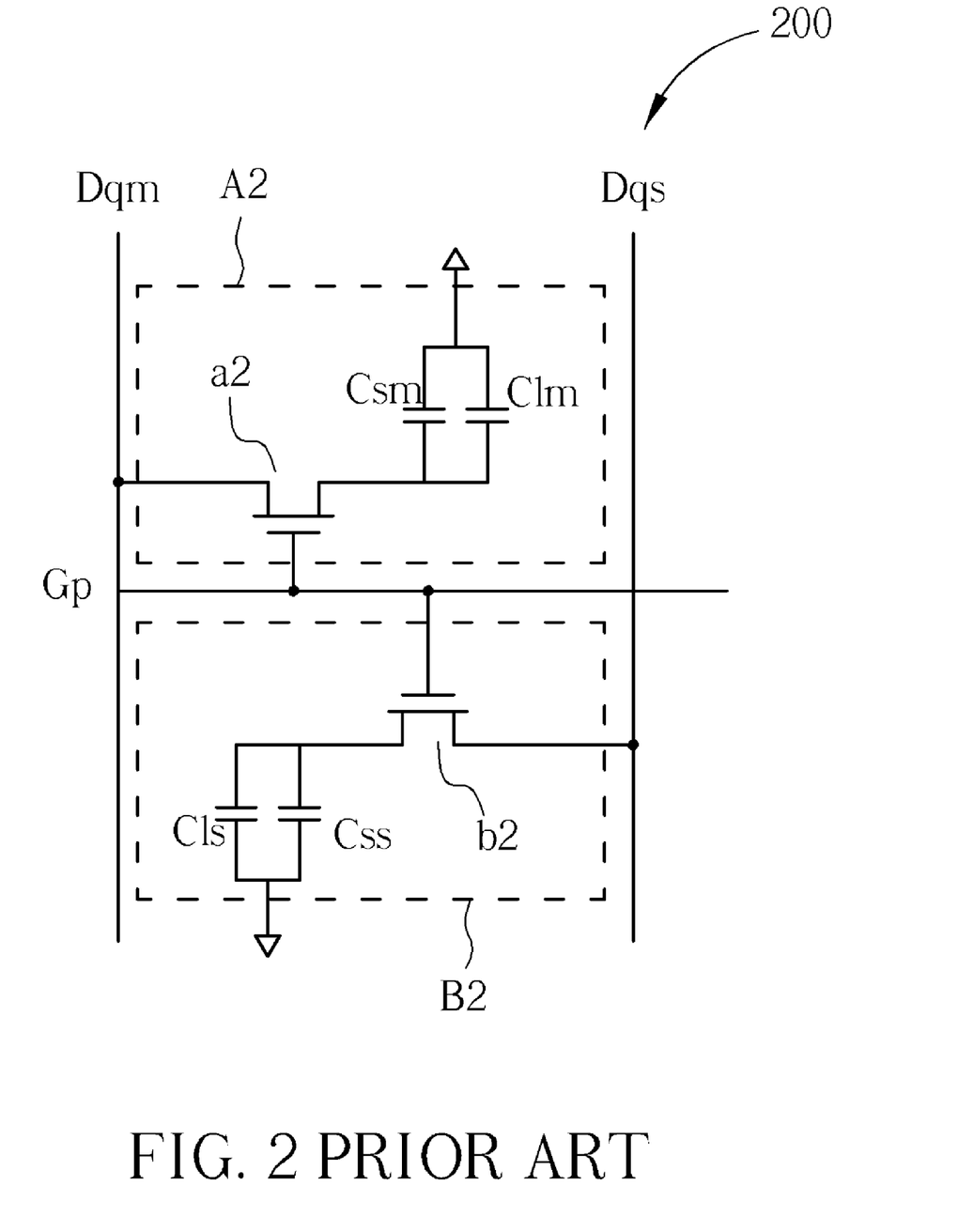
FIG. 2 is a diagram of a 1G2D TT-type pixel architecture of the prior art.

TT-type technology can be broadly split into two categories: 2G1D and 1G2D. The former utilizes two gate signal lines and one data signal line per pixel; the latter utilizes one gate signal line and two data signal lines per pixel. Please refer to FIG. 1 and FIG. 2. FIG. 1 is a diagram of a 2G1D pixel architecture for TT-type. FIG. 2 is a diagram of a 1G2D pixel architecture for TT-type. In FIG. 1, the (p,q)th pixel 100 of the LCD panel is split into two pixel elements: a main pixel A1 and a sub-pixel B1. The main pixel A1 has a switch element a1 having a drain electrode electrically connected to a storage capacitor Csm and a liquid crystal capacitor Clm. The sub-pixel B1 has a switch element b1 having a drain electrode electrically connected to a storage capacitor Css and a liquid crystal capacitor Cls. The pixel 100 utilizes two gate signal lines Gpm, Gps. The first gate signal line Gpm, which corresponds to the main pixel A1, is electrically connected to a gate of the switch element a1. The second gate signal line Gps, which corresponds to the sub-pixel B1, is electrically connected to a gate of the switch element b1. A data signal line Dq is commonly used by the main pixel A1 and the sub-pixel B1, and is electrically connected to source electrodes of the switch element a1 and the switch element b1, respectively. A storage capacitor line Cs is another line commonly utilized by the main pixel A1 and the sub-pixel B1. The storage capacitor line Cs is electrically connected to common electrodes of the storage capacitors Csm, Css of the main pixel A1 and the sub-pixel B1. Likewise, in FIG. 2, a (p,q)th pixel 200 of the LCD panel is also divided into a main pixel A2 and a sub-pixel B2. The main pixel A2 has a switch element a2; the sub-pixel B2 has a switch element b2. Drain electrodes of the switch element a2 and the switch element b2 are likewise electrically connected to storage capacitors Csm, Css and liquid crystal capacitors Clm, Cls, respectively. In FIG. 2, a data signal line Dqm corresponding to the main pixel A2 is electrically connected to a source electrode of the switch element a2, and a data signal line Dqs corresponding to the sub-pixel B2 is electrically connected to a source electrode of the switch element b2. A gate signal line Gp commonly utilized by the main pixel A2 and the sub-pixel B2 is electrically connected to gate electrodes of the switch element a2 and the switch element b2.

It can be seen from FIG. 1 and FIG. 2 that, regardless of which connection topology (2G1D or 1G2D) is employed, the number of lines utilized in the LCD panel is increased twofold over the original connection scheme. 2G1D requires twice as many gate signal lines, the number of pins for a driving IC must also increase twofold, and the number of scanlines also doubles. Scan time for each pixel is cut in half, which leads to a problem of insufficient charging time for pixel data. Likewise, 2D1G requires twice as many data signal lines, and the number of pins for a driving IC is doubled, which causes increases in manufacturing cost of the LCD panel. Thus, one major field of research in LCD display design involves how to overcome the above-mentioned problems through design of an 8-domain AMVA LCD panel.

SUMMARY OF THE INVENTION

In one embodiment, a liquid crystal display comprises (m+2) gate signal lines, n data signal lines, and a pixel array. The (m+2) gate signal lines are utilized for transmitting (m+2) gate signals, where m is a positive integer. The n data signal lines are utilized for transmitting n data signals, where n is a positive integer. The pixel array includes m*n pixels. An $(i,j)^{th}$ pixel of the m*n pixels comprises a main pixel, a sub-pixel, a resistor, and a third switch element. The main pixel comprises a first switch element, a main pixel storage capacitor, and a main pixel liquid crystal capacitor. A gate electrode of the first switch element is electrically connected to an $i^{th}$ gate signal line, and a source electrode of the first switch element is electrically connected to a $j^{th}$ data signal line. A first electrode of the main pixel storage capacitor is electrically connected to a drain electrode of the first switch element. A first electrode of the main pixel liquid crystal capacitor is electrically connected to the drain electrode of the first switch element. The sub-pixel comprises a second switch element, a sub-pixel storage capacitor, and a sub-pixel liquid crystal capacitor. A source electrode of the second switch element is electrically connected to the $j^{th}$ data signal line. A first electrode of the sub-pixel storage capacitor is electrically connected to a drain electrode of the second switch element. A first electrode of the sub-pixel liquid crystal capacitor is electrically connected to the drain electrode of the second switch element. The resistor has a first electrode electrically connected to a gate electrode of the second switch element, and a second electrode electrically connected to the $i^{th}$ gate signal line. A gate electrode of the third switch element is electrically connected to an $(i+1)^{th}$ gate signal line, a source electrode of the third switch element is electrically connected to an (i−1)th gate signal line, and a drain electrode of the third switch element electrically connected to a gate electrode of the second switch element.

In another embodiment, a display method for a liquid crystal display comprises simultaneously performing pre-charging of a main pixel and a sub-pixel of an (i,j)th pixel during transmission of data to a main pixel of an (i−1,j)th pixel, transmitting data to the sub-pixel of the (i,j)th pixel and performing pre-charging of the main pixel after completion of transmitting data to the main pixel of the (i−1,j)th pixel, and stopping transmission of data to the sub-pixel of the (i,j)th pixel after completion of transmitting data to the sub-pixel of the (i,j)th for only allowing data transmitted to the (i,j)th pixel to be transmitted to the main pixel of the (i,j)th pixel. In the above, i is a positive integer greater than 1, and j is a positive integer.

These and other objectives of the present invention will no doubt become obvious to those of ordinary skill in the art after reading the following detailed description of the preferred embodiment that is illustrated in the various figures and drawings.

DETAILED DESCRIPTION

Regarding the disadvantages of the TT-type pixel AMVA LCD described above, the present invention proposes a pixel architecture that utilizes a switch element for controlling charge times of the main pixel and the sub-pixel. In addition, the pixel architecture employs a pre-charging technique. Thus, only one gate signal line each need be added to upper and lower regions of an LCD panel to incorporate the pixel architecture into an AMVA LCD panel, without increasing number of scanlines or data lines utilized in the panel. In this way, the problems of reducing the scan time by half, insufficient pixel data charging time, and increased number of driving IC pins may be avoided.

Certain terms are used throughout the following description and claims to refer to particular components. As one skilled in the art will appreciate, manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". Additionally, the term "electrically connected" should be interpreted to include any direct or indirect electrical connection. Thus, if a first device is electrically connected to a second device in the text, this means that the first device may connect directly to the second device, or may connected indirectly to the second device through other devices or connection means.

Figure 3:
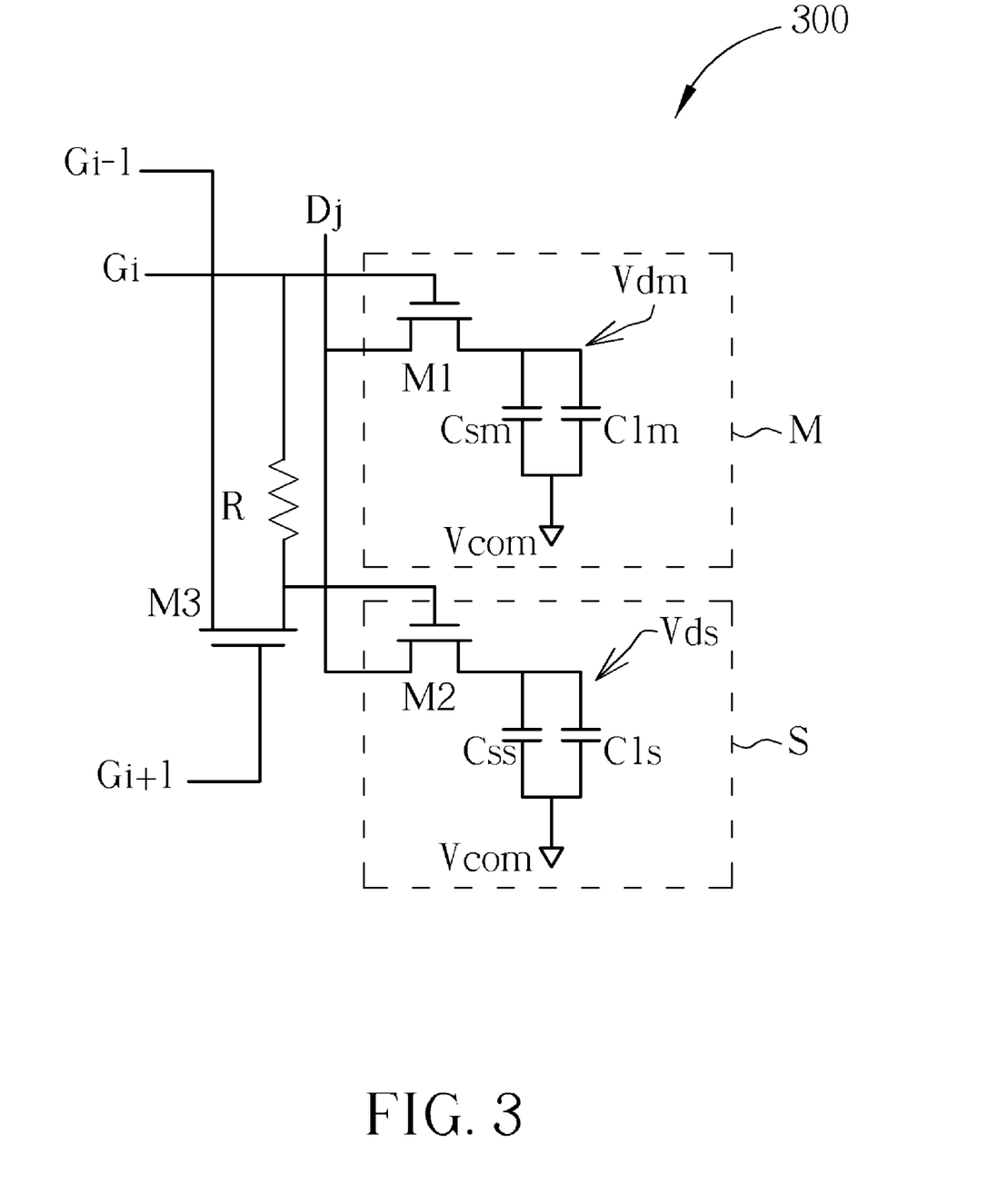
FIG. 3 is a diagram of architecture of a pixel according to an embodiment of the present invention.
Figure 4:
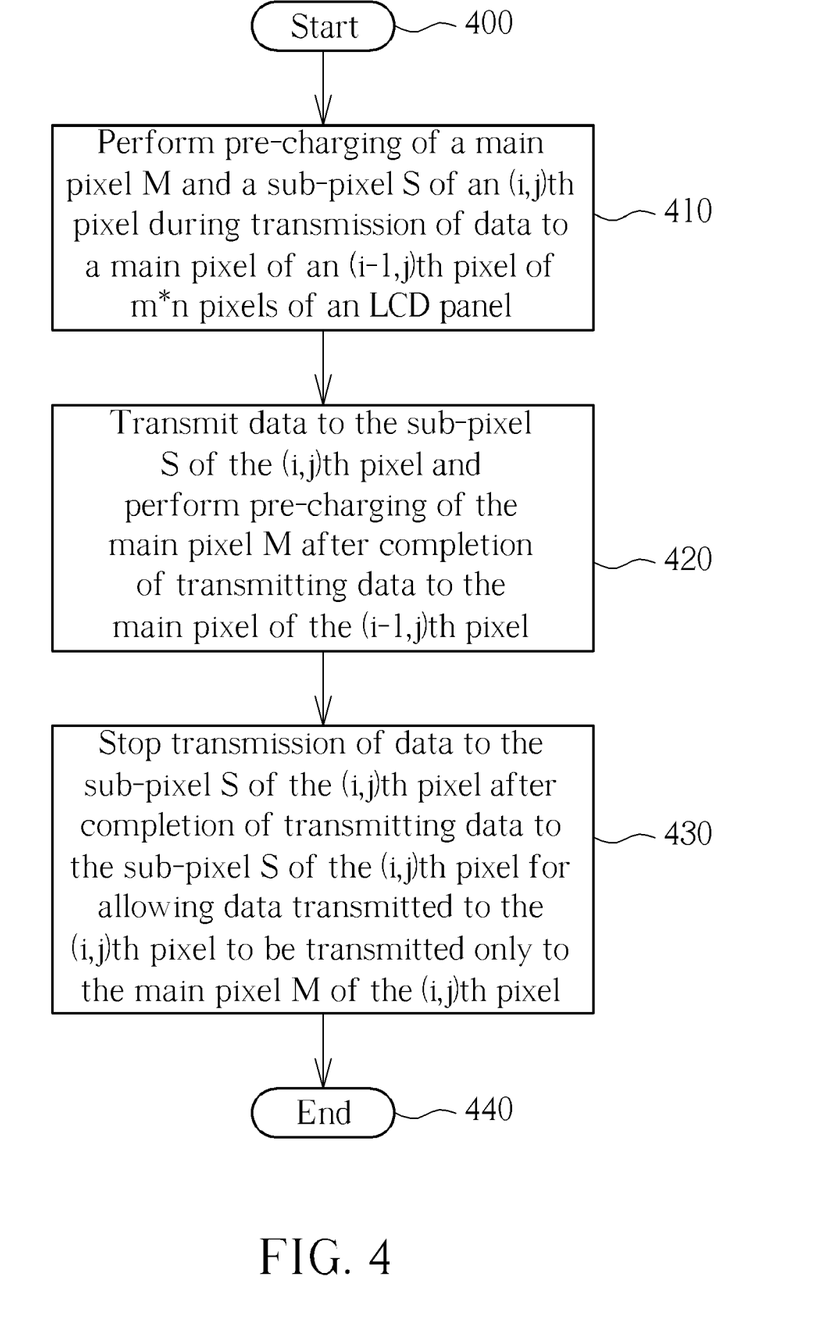
FIG. 4 is a flowchart of a display method for a liquid crystal display according to an embodiment of the present invention.
Figure 5:
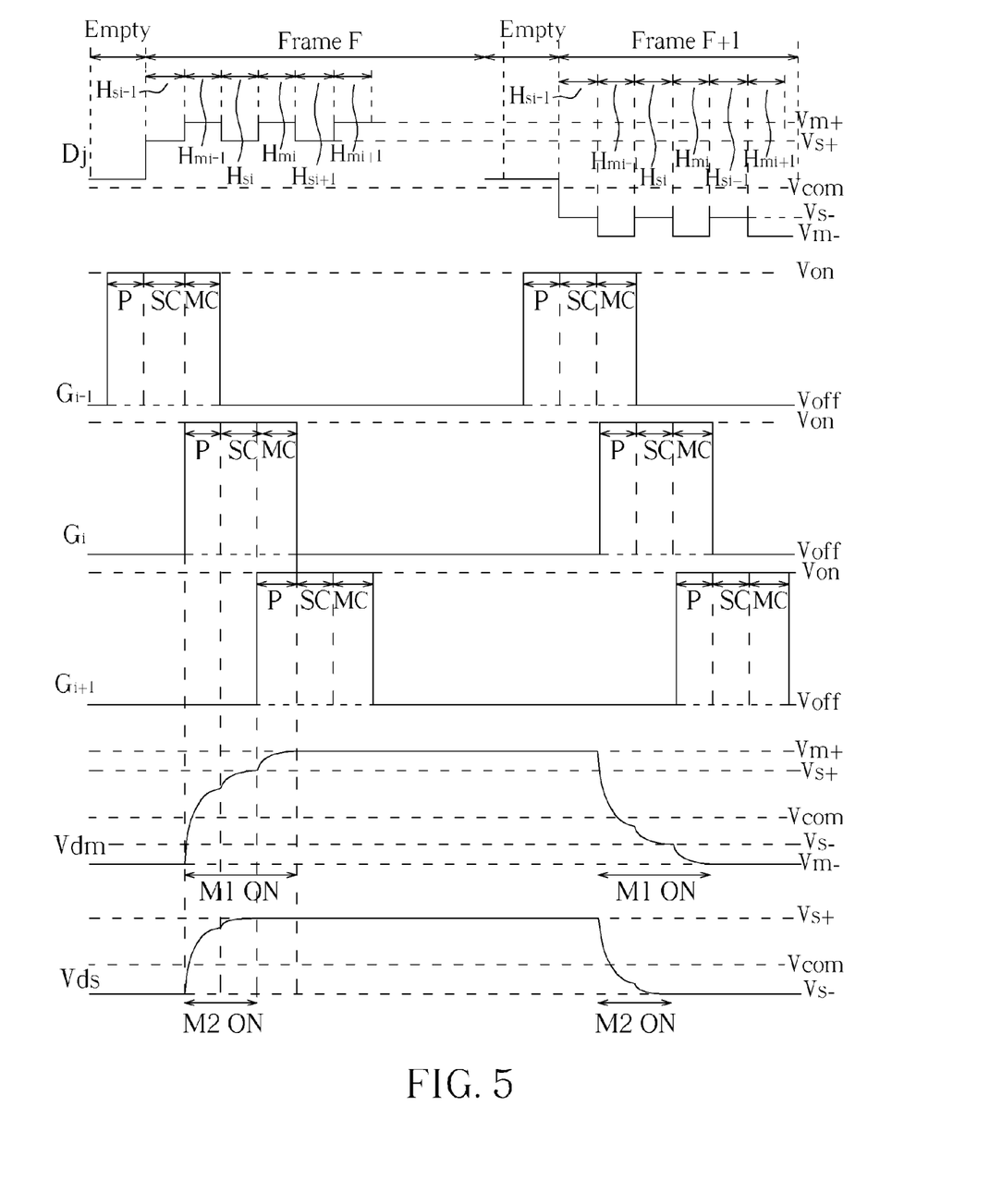
FIG. 5 is a waveform diagram according to an embodiment of the present invention.

Please refer to FIG. 3, FIG. 4, and FIG. 5. FIG. 3 is a diagram of architecture of a pixel 300 according to an embodiment of the present invention. The pixel 300 of the LCD of FIG. 3 is an $(i,j)^{th}$ pixel 300 of m*n pixels of an LCD panel, where m, n, i, and j are all positive integers. The $(i,j)^{th}$ pixel 300 comprises a main pixel M, a sub-pixel S, a resistor R, and a third switch element M3. The main pixel M comprises a first switch element m1, a main pixel storage capacitor Csm, and a main pixel liquid crystal capacitor Clm. A gate electrode of the first switch element M1 is electrically connected to an $i^{th}$ gate signal line Gi, and a source electrode of the first switch element M1 is electrically connected to a $j^{th}$ data signal line Dj. A first electrode of the main pixel storage capacitor Csm and a first electrode of the main pixel liquid crystal capacitor Clm are both electrically connected to a drain electrode of the first switch element M1. This node has a voltage of the main pixel voltage Vdm. A second electrode of the main pixel storage capacitor Csm and a second electrode of the main pixel liquid crystal capacitor Clm are electrically connected to a common voltage Vcom. The sub-pixel S comprises a second switch element M2, a sub-pixel storage capacitor Css, and a sub-pixel liquid crystal capacitor Cls. A source electrode of the second switch element M2 is electrically connected to a $j^{th}$ data signal line Dj. A first electrode of the sub-pixel storage capacitor Css and a first electrode of the sub-pixel liquid crystal capacitor Cls are both electrically connected to a drain electrode of the second switch element M2. This node has a voltage of the sub-pixel voltage Vds. The resistor R is electrically connected between a gate electrode of the switch element M2 and an $i^{th}$ gate signal line Gi. A gate electrode of the third switch element M3 is electrically connected to an $(i+1)^{th}$ gate signal line Gi+1; a source electrode of the third switch element M3 is electrically connected to an (i−1)th gate signal line Gi−1; a drain electrode of the third switch element M3 is electrically connected to a gate electrode of the second switch element M2. A second electrode of the sub-pixel storage capacitor Css and a second electrode of the sub-pixel liquid crystal capacitor Cls are electrically connected to a common voltage Vcom. The main pixel storage capacitor Csm and the sub-pixel storage capacitor Css may be realized with one capacitor, and the main pixel liquid crystal capacitor Clm and the sub-pixel liquid crystal capacitor Cls may also be realized with one capacitor.

FIG. 4 is a flowchart of a display method for a liquid crystal display according to an embodiment of the present invention. The display method shown in FIG. 4 comprises the following steps:

Step 400: Start;

Step 410: Perform pre-charging of a main pixel M and a sub-pixel S of an $(i,j)^{th}$ pixel 300 during transmission of data to a main pixel of an $(i-1,j)^{th}$ pixel of m*n pixels of an LCD panel;

Step 420: Transmit data to the sub-pixel S of the $(i,j)^{th}$ pixel 300 and perform pre-charging of the main pixel M after completion of transmitting data to the main pixel of the $(i-1, j)^{th}$ pixel; and Step 430: Stop transmission of data to the sub-pixel S of the $(i,j)^{th}$ pixel 300 after completion of transmitting data to the sub-pixel S of the $(i,j)^{th}$ pixel 300 for allowing data transmitted to the $(i,j)^{th}$ pixel 300 to be transmitted only to the main pixel M of the $(i,j)^{th}$ pixel 300;

Step 440: End.

FIG. 5 is a waveform diagram according to an embodiment of the present invention. In FIG. 5, during frames F and F+1, data signals transmitted over a $j^{th}$ data signal line Dj are (in order): a data signal Hsi−1 of a sub-pixel of an $(i-1,j)^{th}$ pixel, a data signal Hmi−1 of a main pixel of the $(i-1,j)^{th}$ pixel, a data signal Hsi of the sub-pixel S of the $(i,j)^{th}$ pixel 300, a data signal Hmi of the main pixel M of the $(i,j)^{th}$ pixel 300, a data signal Hsi+1 of a sub-pixel of an $(i+1,j)^{th}$ pixel, and a data signal Hmi+1 of a main pixel of the $(i+1,j)^{th}$ pixel. The gate signals sent over gate signal lines Gi−1, Gi, and Gi+1 include a pre-charging signal P, a sub-pixel charging signal SC, and a main pixel charging signal MC. In the embodiment, the pre-charging signal P, sub-pixel charging signal SC, and main pixel charging signal MC are split into three equal parts. However, this embodiment is not a limitation of the present invention. The pre-charging signal P, sub-pixel charging signal SC, and main pixel charging signal MC may also be comprised in the gate signal with unequal proportions. Because neighboring frames have opposite polarity, length of the pre-charging signal P should be set to a length that allows driving voltage of the main pixel and the sub-pixel to be charged higher (or lower) than the common voltage Vcom. Length of the sub-pixel charging signal SC comprised in the gate signal must be sufficient to allow the data of the sub-pixel to be transmitted completely to the sub-pixel. Likewise, the main pixel charging signal MC comprised in the gate signal must be sufficient to allow the data of the main pixel to be transmitted completely to the main pixel.

Taking the frame F shown in FIG. 5 as an example, the display method of FIG. 4 starts with Step 400. Upon completion of data transfer to a sub-pixel of an $(i-1,j)^{th}$ pixel of m*n pixels of an LCD panel, namely transfer of the sub-pixel charging signal SC of the gate signal on the gate signal line Gi−1 of FIG. 5, the gate signal on the gate signal line Gi−1 enters the main pixel charging signal MC (Step 410 of FIG. 4). At this time, the gate signal on the gate signal line Gi electrically connected to the $(i,j)^{th}$ pixel 300 also enters the pre-charging signal P. Thus, as shown in FIG. 3, at this time, the first switch element M1 and the second switch element M2, which are electrically connected to the gate signal line Gi, are turned on, and a data signal on the $j^{th}$ data signal line Dj is transmitted to the first switch element M1 and the second switch element M2. As shown in FIG. 5, at this time, the data signal on the data signal line Dj is the data signal Hmi−1 of the main pixel of the $(i-1,j)^{th}$ pixel. However, because the charge time is insufficient during the period of the pre-charging signal P on the gate signal line Gi, the main pixel voltage Vdm and the sub-pixel voltage Vds of FIG. 3 will not be charged to the voltage level of the data signal Hmi−1, but may only be charged to approximately a voltage level above the common voltage Vcom. Next, the gate signal on the gate signal line Gi−1 shuts off, and the gate signal on the gate signal line Gi enters the sub-pixel charging signal Sc (Step 420 of FIG. 4). Similar to the above, the first switch element M1 and the second switch element M2, which are electrically connected to the gate signal line Gi, are turned on, and the data signal on the $j^{th}$ data signal line Dj is transmitted to the first switch element M1 and the second switch element M2. At this time, the data signal on the data signal line Dj is the data signal His of the sub-pixel S of the $(i,j)^{th}$ pixel 300. The sub-pixel voltage Vds of FIG. 3 may be charged to a voltage level of the data signal Hsi, and because the main pixel is typically brighter than the sub-pixel, namely the main pixel voltage Vdm is typically higher than the sub-pixel voltage Vds, although the main pixel voltage Vdm is increased due to the data signal Hsi, it will not reach the voltage level of the data signal Hmi of the main pixel M of the $(i,j)^{th}$ pixel 300. Thus, after transmission of data to the sub-pixel S of the $(i,j)^{th}$ pixel 300 is complete, the path to the sub-pixel S of the $(i,j)^{th}$ pixel 300 is shut off, so that the data of the $(i,j)^{th}$ pixel 300 only continues to be transmitted to the main pixel M of the $(i,j)^{th}$ pixel 300 (Step 430 of FIG. 4). In other words, at this time, the gate signal on the gate signal line Gi enters the main pixel charging signal MC, and the gate signal on the gate signal line Gi+1 enters the pre-charging signal P. Thus, the third switch element M3 electrically connected to the gate signal line Gi+1 is turned on, and the gate signal on the gate signal line Gi−1 is transmitted to the third switch element M3. However, at this time, no signal is present on the gate signal line Gi−1. Thus, voltage on the drain electrode of the third switch element M3 approaches Voff. The first switch element M1 electrically connected to the gate signal line Gi is still turned on, but the second switch element M2 is turned off, as its gate electrode is electrically connected to the drain electrode of the switch element M3, which has a voltage of Voff. Thus, the data signal Hmi on the $j^{th}$ data signal line Dj is only transmitted to the first switch element M1. When the main pixel voltage Vdm of FIG. 3 reaches the voltage level of the data signal Hmi, the display method ends (Step 440 of FIG. 4).

Similarly, the next frame F+1 has negative polarity. Thus, in the next frame F+1, in the period of the pre-charging signal P on the gate signal line Gi, the main pixel voltage Vdm and the sub-pixel voltage Vds of the $(i,j)^{th}$ pixel 300 are charged to at least lower than the voltage level of the common voltage Vcom (inverse polarity). Then, according to the same steps described above, the charging process of the main pixel M and the sub-pixel S of the $(i,j)^{th}$ pixel 300 is completed. Please note that method described above may be utilized in an LCD employing column inversion or frame inversion. In other words, polarity of pixels in the same column must be the same for the pre-charging technique mentioned above to be effective.

Figure 6:
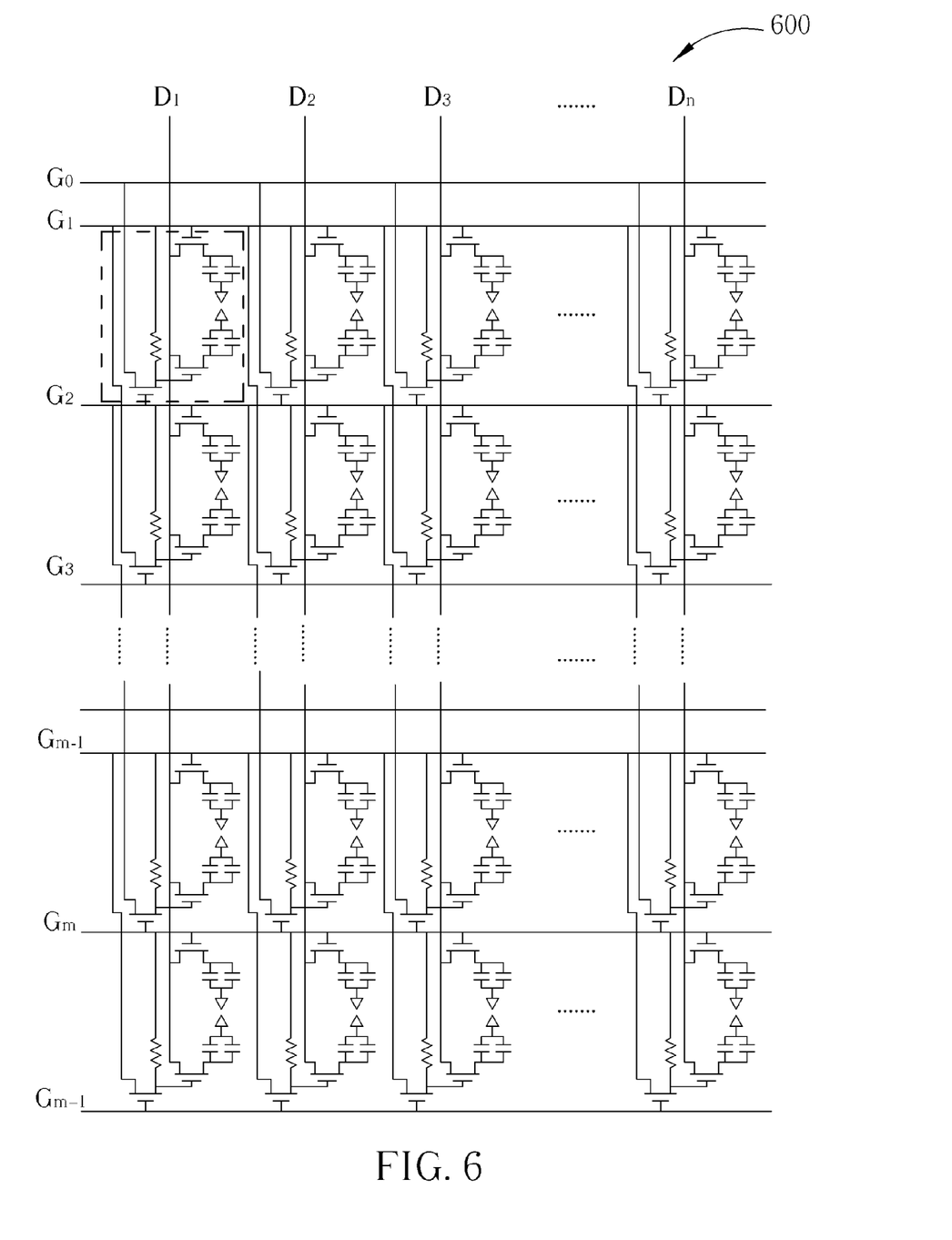
FIG. 6 is a diagram of architecture of an LCD panel 600 according to an embodiment of the present invention.

Please refer to FIG. 6, which is a diagram of architecture of an LCD panel 600 according to an embodiment of the present invention. The LCD panel 600 shown in FIG. 6 comprises m*n pixels, data signal lines D1-Dn, and gate signal lines G0-Gm+1. Each pixel of the m*n pixels has architecture the same as the pixel 300. The gate signal lines G0 and Gm+1 shown in FIG. 6 are two extra gate signal lines added in the embodiments of the present invention. The remaining data signal lines D1-Dn and gate signal lines G1-Gm are signal lines existing in traditional LCD panels. Pre-charging of the pixels (1,1)-(1,n) must be performed during transmission of the main pixel charging signal MC on the gate signal line G0. Likewise, during this time, a main pixel data signal must be sent over the data signal lines D1-Dn, so as to pre-charge the main pixel voltage Vdm and the sub-pixel voltage Vds of the corresponding pixels to voltage levels above the common voltage Vcom (for positive-polarity frames) or below the common voltage Vcom (for negative-polarity frames). The third switch elements of the pixels (m,1)~(m,n) may be turned off through the pre-charging signal P on the gate signal Gm+1, so that the sub-pixel voltage Vds and the main pixel voltage Vdm of the pixels (m,1)~(m,n) may be charged to the required voltage levels, respectively.

The embodiments of the present invention utilize a switch element to control the charging time of the main pixel and the sub-pixel of each pixel, and further employ the pre-charging technique, so that only one gate signal line need be added to each of the top and bottom portions of the LCD panel to obtain a TT-type AMVA design that provides an effective and cost-saving solution for overcoming the disadvantages of doubled number of data signal lines or gate signal lines in the traditional LCD panel.

Those skilled in the art will readily observe that numerous modifications and alterations of the device and method may be made while retaining the teachings of the invention.

What is claimed is:

1. A liquid crystal display comprising:
(m+2) gate signal lines utilized for transmitting (m+2) gate signals;
n data lines utilized for transmitting n data signals; and
a pixel array comprising m*n pixels, an $(i,j)^{th}$ pixel of the m*n pixels comprising:
  a main pixel comprising:
    a first switch element having:
      a gate electrode electrically connected to an $i^{th}$ gate signal line; and
      a source electrode electrically connected to a $j^{th}$ data signal line;
    a main pixel storage capacitor having a first electrode electrically connected to a drain electrode of the first switch element; and
    a main pixel liquid crystal capacitor having a first electrode electrically connected to the drain electrode of the first switch element;
  a sub-pixel comprising:
    a second switch element having a source electrode electrically connected to the $j^{th}$ data signal line;
    a sub-pixel storage capacitor having a first electrode electrically connected to a drain electrode of the second switch element; and
    a sub-pixel liquid crystal capacitor having a first electrode electrically connected to the drain electrode of the second switch element;
  a resistor having:
    a first electrode electrically connected to a gate electrode of the second switch element; and
    a second electrode electrically connected to the $i^{th}$ gate signal line; and
  a third switch element having:
    a gate electrode electrically connected to an $(i+1)^{th}$ gate signal line;
    a source electrode electrically connected to an $(i-1)^{th}$ gate signal line; and
    a drain electrode electrically connected to a gate electrode of the second switch element;
wherein m, n, i, and j are positive integers.

2. The liquid crystal display of claim 1, wherein the first switch element is a thin film transistor (TFT).

3. The liquid crystal display of claim 1, wherein the second switch element is a TFT.

4. The liquid crystal display of claim 1, wherein the third switch element is a TFT.

5. The liquid crystal display of claim 1, wherein a second electrode of the main pixel storage capacitor and a second electrode of the main pixel liquid crystal capacitor are electrically connected to a common voltage.

6. The liquid crystal display of claim 1, wherein a second electrode of the sub-pixel storage capacitor and a second electrode of the sub-pixel liquid crystal capacitor are electrically connected to a common voltage.

7. The liquid crystal display of claim 1, wherein the main pixel storage capacitor and the sub-pixel storage capacitor are the same capacitor.

8. The liquid crystal display of claim 1, wherein the main pixel liquid crystal capacitor and the sub-pixel liquid crystal capacitor are the same capacitor.

9. A display method for a liquid crystal display, the display method comprising:
simultaneously performing pre-charging of a main pixel and a sub-pixel of an $(i,j)^{th}$ pixel during transmission of data to a main pixel of an $(i-1,j)^{th}$ pixel;
transmitting data to the sub-pixel of the $(i,j)^{th}$ pixel and performing pre-charging of the main pixel after completion of transmitting data to the main pixel of the $(i-1,j)^{th}$ pixel; and
stopping transmission of data to the sub-pixel of the $(i,j)^{th}$ pixel after completion of transmitting data to the sub-pixel of the $(i,j)^{th}$ pixel for allowing data transmitted only to the $(i,j)^{th}$ pixel to be transmitted to the main pixel of the $(i,j)^{th}$ pixel;
wherein i is a positive integer greater than 1, and j is a positive integer.

10. The display method of claim 9, wherein the liquid crystal display utilizing the display method employs column inversion.

11. The display method of claim 9, wherein the liquid crystal display utilizing the display method employs frame inversion.

* * * * *